United States Patent [19]

Covington

[11] 4,265,399
[45] May 5, 1981

[54] SNOW CHAIN

[76] Inventor: Joseph C. Covington, 7000 S. Wasbash, Chicago, Ill. 60637

[21] Appl. No.: 69,176

[22] Filed: Aug. 23, 1979

[51] Int. Cl.³ .............................................. E01B 23/00
[52] U.S. Cl. ....................................................... 238/14
[58] Field of Search ........................ 238/14; D12/154; 152/208, 213 R, 223-230

[56] References Cited

U.S. PATENT DOCUMENTS

| | | | |
|---|---|---|---|
| 1,218,767 | 3/1917 | Heginbottom | 238/14 |
| 1,335,546 | 3/1920 | Bardon | 238/14 |
| 3,289,939 | 12/1966 | Martinov | 238/14 |
| 3,512,613 | 5/1970 | Peterson | 238/14 X |

FOREIGN PATENT DOCUMENTS 891945  2/1972  Canada ...................................... 238/14

Primary Examiner—Randolph A. Reese
Attorney, Agent, or Firm—Hill, Van Santen, Steadman, Chiara & Simpson

[57] ABSTRACT

A heavy duty anti-skid device of the type that can be folded into a compact unit for storage comprising a series of three open framed sections with each section being parallel-sided and comprised of angle iron mesh having four edges in welded assembly with the parallel-sided angle iron on each of the sections providing tire gripping areas. Links are pivotally secured at opposite ends to the sections for joining the sections together and for enabling the sections to be folded at the areas of the links so the open framed sections can be positioned in end-to-end relation for co-action with a vehicle wheel to assist in extraction of the wheel from an immobilized position and with the open-framed sections being pivotal at their connections with the links for disposition of the sections in superimposed folded relatively flat relation with respect to one another for ease of storage. U-shaped handles are provided for at least one section with each handle having opposite ends secured with one side of parallel sided section to aid in transporting the device and also serving the resist relative lateral movement and disengagement of the vehicle tire from the anti-skid device.

5 Claims, 5 Drawing Figures

U.S. Patent
May 5, 1981
4,265,399
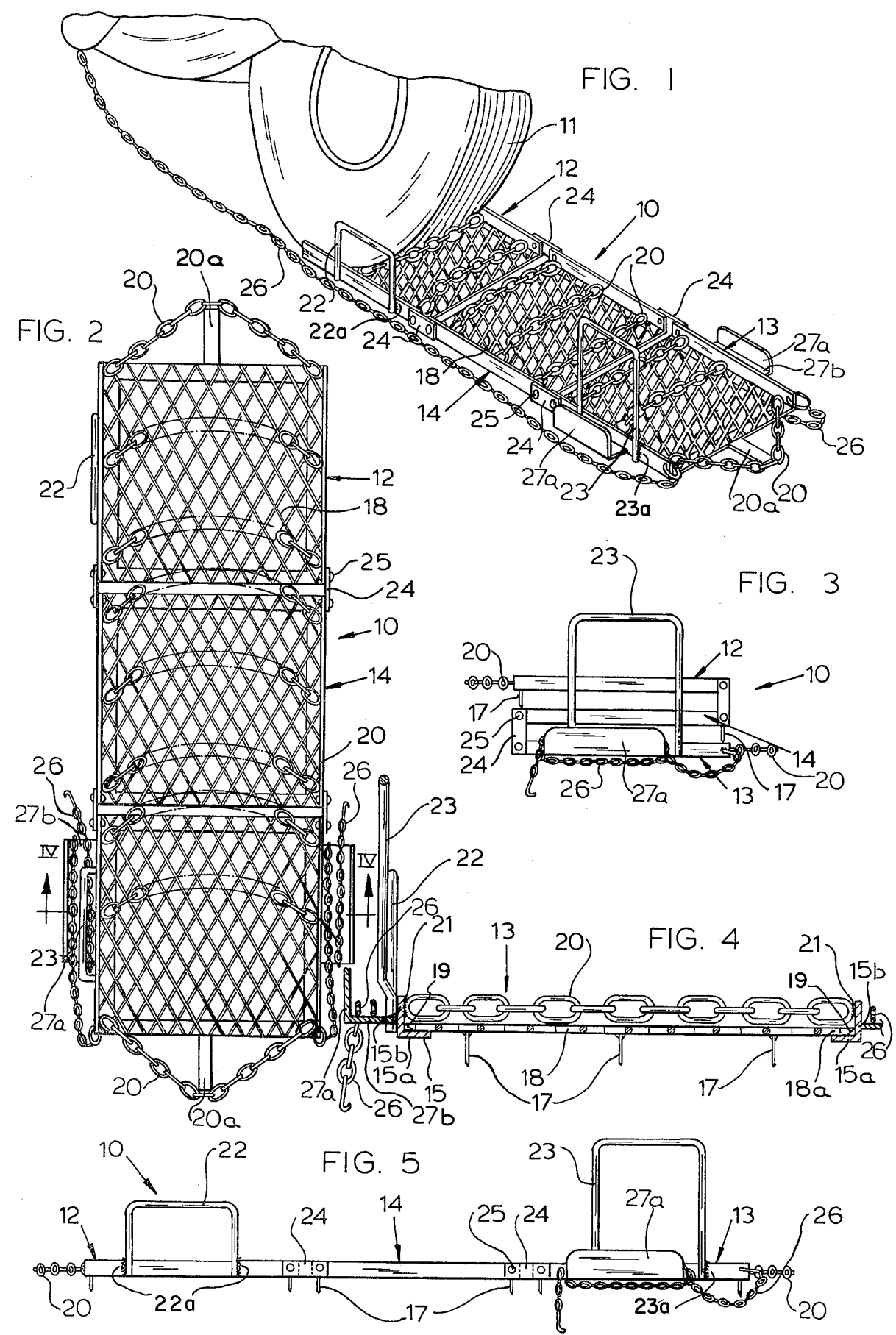

SNOW CHAIN

BACKGROUND OF THE INVENTION

1. Field of the Invention

This invention is in the field of anti-skid devices and, in particular, is concerned with a heavy duty anti-skid device of the type that can be folded into a compact unit for storage.

2. Description of the Prior Art

In the patented prior art various types of anti-skid devices have been the subject of a number of U.S. patents. There are a variety of different types of anti-skid devices for attachment to vehicle wheels including skid chains such as are generally shown in U.S. Pat. No. 2,599,634 which are directly attachable to a vehicle wheel. Other types of devices are also in the prior art for use in an emergency to assist in releasing a vehicle out of snow, ice or mud such as is shown in U.S. Pat. No. 3,350,013. The emergency track as shown in this patent is multi-sectioned and has a series of spaced legs 16 and 18 on tracks 10 as well as spaced abutments 24 and 26 all of which coact to assist a vehicle in obtaining traction to gain release from snow, ice or mud. Other types of vehicle traction devices are disclosed in U.S. Pat. No. 3,672,422 which device is a single section 10 and is provided with a cord or chain for attachment to a bumper as indicated at 24 in FIG. 4. Still another type of prior art anti-skid device is a traction pad as shown in U.S. Pat. No. 3,749,309 which again is comprised of a single section. Still another type of traction aid for vehicles is disclosed in U.S. Pat. No. 3,878,988 where the device is again a single U-shaped section with legs for biting into the turf and with curved braces 6 for vehicle wheel engagement to aid in releasing a vehicle from mud and the like.

With respect to the subject of the present invention, the G. H. Merrick U.S. Pat. No. 2,479,760 shows a multi-sectioned traction device where the sections are joined together by brackets 15 and links 16 with the links 16 being pinned to the brackets at central areas between the sections.

SUMMARY OF THE INVENTION

This invention is related to a new and improved heavy duty anti-skid device of the type comprised of a series of sections that can be folded relative to one another into a compact unit for storage and which then can be unfolded and placed in proximity to a vehicle wheel and then used as a traction aid to assist in the removal of the vehicle wheel from mud, snow and ice and the like. Since the sections are secured together by links which are pivotally joined at opposite ends to adjacent sections the sections are somewhat moveable relative to one another to adjust to variations in the terrain in adjacency to the vehicle wheel.

According to important features of this invention, the device is comprised of a series of three open framed sections each being parallel sided and comprised of angle iron with mesh being disposed on each of the sections. The mesh has its four marginal edges secured in welded assembly with the parallel sided angle iron. The angle iron is provided with upright legs and inwardly extending legs which serve important functions in connection with the operation of the heavy duty anti-skid device. The mesh is mounted and secured with the inside legs on these sections to provide tire gripping areas. Links are pivotally secured at opposite ends to the upright legs and are disposed at opposite sides of these sections rather than centrally of the sections to provide means for joining the sections together and to provide means for enabling the sections to be folded at the areas of the links so the open framed sections can be positioned in end to end relation for coaction with a vehicle wheel to assist in extraction of the wheel from an immobilized position. The links are also movable when the sections are folded so as to be positionable in a position generally angled or at right angles to the sections so that the sections can be compactly folded with respect to one another. Also, the sections are provided with U-shaped handles secured to the angle iron on the same side of each of the end sections so that the anti-skid device can be readily transported with the handles in side-by-side relation.

BRIEF DESCRIPTION OF THE DRAWINGS

A preferred embodiment of the present invention has been illustrated in the drawings, in which:

FIG. 1 is a perspective view of a heavy duty anti-skid device and a vehicle wheel showing the manner in which the anti-skid device is adapted to coact therewith;

FIG. 2 is a top plan view of the anti-skid device shown in FIG. 1;

FIG. 3 is an end view of the anti-skid device with the various sections of the anti-skid device shown in folded relation for ready transport;

FIG. 4 is a vertical section taken along the lines IV—IV looking in the direction indicated by the arrows as seen in FIG. 2; and FIG. 5 is a side view of the anti-skid device shown in FIG. 2.

DESCRIPTION OF THE PREFERRED EMBODIMENT

The reference numeral 10 indicates an anti-skid device which is adapted to be spread out and placed in front of the rear wheel of an automobile that has become stuck in the snow or mud. One must be used in front of each of the rear wheels or in the direction in which the automobile is attempting to be moved. In FIG. 1, the vehicle wheel is illustrated at 11.

The device 10 includes end sections 12 and 13 and a middle section 14. Each section is comprised of a parallel sided piece of angle iron 15 where the pieces are welded in a conventional manner at each corner. The angle iron 15 includes an inwardly extending leg 15a and an upright leg 15b disposed at right angles thereto. These legs extend continuously about the four sides of each section 12, 13 and 14, thus providing a sturdy structure.

Mounted bottom side of the sections and connected to the bottom side of the inwardly extending legs 15a are a series of cleats or spikes 17 as seen in FIGS. 3, 4 and 5. These spikes are adapted to dig into the mud or snow so that the device 10 can resist the movement when engaged with the vehicle wheel 11.

Mounted upon each of the sections 12, 13 and 14 is a piece of mesh 18. The mesh has an outer peripheral edge 18a which laps over the inwardly extending legs 15a and welds 19 are provided to secure the four edges 18a at the four sides of the mesh or at the edge areas of the mesh to the inwardly extending legs 15b of the angle iron 15 on each of these sections 12, 13 and 14.

Positioned on each of the sections are a series of transversely extending relatively loose chains 20. The chains are disposed on each of the sections on the side opposite of the cleats or spikes 17. These chains are particularly adapted for engagement with the vehicle wheel 11 too as a further means to resist skidding as the tire or wheel 11 is rotated to gain traction. The chains 20 are each welded at opposite ends to opposed inwardly extending legs 15a on the angle iron 15 of each section as seen in FIG. 2 and in FIG. 4.

Also provided on the device 10 are a pair of carrying handles 22 and 23. The handles are generally U-shaped with opposite ends of the legs of the U being secured in welded assembly with the upright legs 15b on the end sections 12 and 13. It will be observed that the handles 22 and 23 are of different sizes so that when the device 10 is positioned in a folded position as will hereafter be further described the one handle will be positioned offset to the other handle so that the person wanting to pick up the device 10 can with his hands simultaneously grasp both handles to ensure that the folded device will move as a unit and not come apart when being transported. It will further be observed that the handles are welded to the upright legs 15b at handle wells 22a and 23a.

In order to connect the sections 12, 13 and 14 of the device 10 together a series of links 24—24 are provided. A pair of the links 24—24 is provided to connect each of the adjacent sections at opposite sides or margins thereof as is best seen in FIG. 2. In other words, a pair of the links 24—24 serve to connect the end section 12 with the middle section 13 and another pair of the links 24—24 serve to connect the middle section 14 with the end section 13. The manner of connection and the relative length of the links also embody features of the present invention so that the sections 12, 13 and 14 of the device 10 can be conveniently collapsed for storage as illustrated in FIG. 3. To this end, the links are of a sufficient length and are each pivotally fastened at opposite ends to adjacent upright legs 15b of the adjacent sections being connected. Suitable fasteners can be provided for the connection but the most desired are heavy-duty type fasteners such as rivets or heavy-duty bolts where the bolt is physically welded to the inside of the inside surface of the upright leg 15b to which it is connected. When the sections are disposed in a relatively flat position as shown in FIG. 1 the links are positioned in parallel relation with respect to the upright legs 15b. It will be appreciated that where the terrain is relatively rough and where the sections 12, 13 and 14 may be disposed at different levels that the links allow these sections to be positioned at different levels relative to one another so that the anti-skid device 10 can be firmly engaged with the ground supporting surface and so the spikes 17 can serve their function by digging into the ground or snow which supports the anti-skid device.

When the sections 12, 13 and 14 are disposed in collapsed relation it will then be seen that the links 24—24 are pivoted on link pins 25 in such a way as to be positioned generally at right angles to the upright legs 15b so that each of these sections can then be positoned in superimposed relatively parallel relation relative to one another. The spikes 17 will serve to support certain areas of the sections 12 and 14 for holding these sections 12, 13 and 14 in parallel relation.

It will further be observed that when the sections are collapsed that the handles are positioned slightly offset relative to one another so as to provide clearance to allow the smaller handle 22 to pass free and clear of the larger handle 23 and yet when these sections are collapsed and positioned in superimposed relation the handles still can be aligned relative to one another so that the person wanting to store the device or carry the device can easily grasp both handles so that the sections will not come apart as the anti-skid device 10 is being transported.

As a further aid to the user of the anti-skid device, it has been provided with lines 26 for bumper attachment as shown in FIG. 1. After the anti-skid device has been relatively positioned for use with the vehicle wheel 11 the lines are then attached to one of the bumpers so that the anti-skid device can be dragged behind the vehicle after the vehicle has been free so that the vehicle driver does not need to retrace his steps for any substantial distance should running space be required to free a vehicle from difficult terrain. One or more of the lines can be used as desired. Angular reels 27—27 are mounted on opposite sides of the section 13 and the chains or chain lines 26 are adapted to be wound thereon to permit them to be stored in a neat compact manner when the device 10 is to be placed in storage. Each reel has right angled flanges 27a with one end of the flange 27a welded to the sections and with the other flange 27b being spaced from the frame of the section to provide a pocket for receiving the chain.

When desired, spacer links 20a are extended longitudinally away from the sections 12 and 13 (FIG. 2) which links 20a are in welded assembly with the frames of the sections 12 and 13 and with the chains 20 to provide an added traction means to aid the entry of the tire onto the device 10 by providing the device with this additional traction means.

Other modifications can also be made without departing from the basic concepts of my invention.

I claim as my invention:

1. A heavy duty anti-skid device of the type that can be folded into a compact unit for storage comprising:

a series of three open framed sections each being parallel-sided and comprised of L-shaped angled members having upright legs and inwardly extending legs with a mesh type member having four edges secured in assembly with the inwardly extending legs of the L-shaped angled members, links pivotally secured at opposite ends to said upright legs disposed at opposite sides of said sections providing means for joining said sections together and providing means for enabling said sections to be folded at the areas of said links and positioned in stacked relation for ready transport so the open framed sections can be unfolded and positioned in end-to-end linear relation for coaction with a vehicle wheel to assist in extraction of the wheel from an immobilized position and with said open-framed sections being pivotal at their connections with said links for disposition of the sections in superimposed folded relatively flat relation with respect to one another for ease of storage, the three sections including a middle open frame section and a pair of end open frame sections at opposite ends of the middle open frame section, an upright U-shaped handle on each of said end sections and said handles being so connected to the associated end section to allow them to be disposed in side-by-side relation when said end sections are in stacked relation to said middle section to facilitate transport of said sections.

2. The anti-skid device of claim 1 further characterized by one of the end sections having at least one reel positioned at a side opposite to the side carrying said U-shaped handle, and at least one tow chain being adapted to be wound about said reel when the tow chain is to be stored, which tow chain is attached to one of the associated sections and which has an opposite end that is adapted to be secured with a bumper of a vehicle for travel therewith so that when the anti-skid device has served its purpose to aid in the release of a vehicle when in a stuck position, then the tow chain is placed in a storage position on said reel, spacer links being extended longitudinally in a direction away from the sections at opposite ends of endmost of the sections and anit-skid chains each having opposite ends secured in assembly with one of said sections at its opposite sides so that the anti-skid chain spans width-wise of the section and with an outer free end of the spacer length being secured with the associated anti-skid chain for holding a medical portion of the anti-skid chain away from the associated section so that a lead-in traction means can be provided for a vehicle wheel to assist in the movement of a vehicle wheel onto the associated section.

3. A heavy duty anti-skid device of the type that can be folded into a compact unit for storage comprising:
   a series of open framed sections each being parallel-sided and comprised of angle iron and mesh with said mesh having four edges in welded assembly with the parallel-sided angle iron, and with angle iron having upright legs and inwardly extending legs,
   mesh mounted and secured with said inside legs on said sections providing tire gripping areas,
   links pivotally secured at opposite ends to said upright legs disposed at opposite sides of said sections providing means for joining said sections together and providing means for enabling said sections to be folded at the areas of said links so the open framed sections can be positioned in end-to-end relation for coaction with a vehicle wheel to assist in extraction of the wheel from an immobilized position and with said open-framed sections being pivotal at their connections with said links for disposition of the sections in superimposed folded relatively flat relation with respect to one another for ease of storage, and
   U-shaped handles with each handle having opposite ends secured in upright relation with one side of said parallel-sided section to aid in transporting the device and which are mounted in outward offset relation on said sections to allow the sections to be compactly folded relative to one another.

4. An anti-skid device comprising:
   a series of three open framed sections with each section being parallel-sided and comprised of angle iron mesh having four edges in welded assembly with the parallel-sided angle iron on each of said sections providing tire gripping areas,
   links pivotally secured at opposite ends to said sections providing means for joining said sections together and providing means for enabling said sections to be folded at the areas of said links so that the open framed sections can be positioned in end-to-end relation for coaction with a vehicle wheel to assist in extraction of the wheel from a stuck position and with said open-framed sections being pivotal at their connections with said links for disposition in superimposed relation for ease of storage, and
   U-shaped handles with each handle having opposite ends secured in upright offset relation with one side of said parallel-sided section to aid in transporting the device when said sections are superimposed for storage and also serving to resist relative lateral movement and disengagement of the vehicle tire from the anti-skid device because of the upright positioning and securement of the handles relative to the associated side of the associated parallel-sided section, one of the U-shaped handles being attached to one of the sections at one end of the device and another of the U-shaped handles being attached to another of the sections at an opposite end of the device, the handles being in side-by-side relation on the same sides of the said sections when said sections are stacked for storage to enable the device to be readily transported.

5. A heavy duty anti-skid device of the type that can be folded into a compact unit for storage comprising:
   a series of open frame sections each being parallel-sided and comprised of angle iron and mesh with said mesh having four edges in welded assembly with the parallel-sided angle iron, and with angle iron having upright legs and inwardly extending legs,
   mesh mounted and secured with said inside legs on said sections providing tire gripping areas, and
   links pivotally secured at opposite ends to said upright legs disposed at opposite sides of said sections providing means for joining said sections together and providing means for enabling said sections to be folded at the areas of said links so the open framed sections can be positioned in end-to-end relation for coaction with a vehicle wheel to assist in extraction of the wheel from an immobilized position and with said open-framed sections being pivotal at their connection with said links for disposition of the sections in superimposed folded relatively flat relation with respect to one another for ease of storage, spacer links being extended longitudinally in a direction away from the sections at opposite ends of end-most of the sections and anti-skid chains each having opposite ends secured in assembly with one of said sections at its opposite sides so that the anti-skid chain spans width-wise of the section and with an outer free end of the spacer length being secured with the associated anti-skid chain for holding a medial portion of the anti-skid chain away from the associated section so that a lead-in traction means can be provided for a vehicle wheel to assist in the movement of a vehicle wheel onto the associated section.

* * * * *